US011364634B2

(12) United States Patent
Becker et al.

(10) Patent No.: US 11,364,634 B2
(45) Date of Patent: Jun. 21, 2022

(54) METHOD FOR PRODUCING A PRODUCT COMPRISING AT LEAST TWO COMPONENTS

(71) Applicant: Bayerische Motoren Werke Aktiengesellschaft, Munich (DE)

(72) Inventors: Tobias Becker, Fahrenzhausen (DE); Franz Korber, Mallersdorf (DE); Carsten Lankenau, Munich (DE); Christian Strauss, Dachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 65 days.

(21) Appl. No.: 16/803,065

(22) Filed: Feb. 27, 2020

(65) Prior Publication Data

US 2020/0198144 A1 Jun. 25, 2020

Related U.S. Application Data

(63) Continuation of application No. PCT/EP2018/071223, filed on Aug. 6, 2018.

(30) Foreign Application Priority Data

Aug. 29, 2017 (DE) ...................... 10 2017 215 028.9

(51) Int. Cl.
*B25J 9/16* (2006.01)
(52) U.S. Cl.
CPC ........... *B25J 9/1687* (2013.01); *B25J 9/1697* (2013.01); *Y10T 29/4978* (2015.01); *Y10T 29/49771* (2015.01); *Y10T 29/49778* (2015.01)
(58) Field of Classification Search
CPC ... B25J 9/1687; B25J 9/1697; Y10T 29/4978; Y10T 29/49778; Y10T 29/49771
See application file for complete search history.

(56) References Cited

U.S. PATENT DOCUMENTS

| 6,591,485 B2 | 7/2003 | Cappa et al. |
| 2006/0167587 A1 | 7/2006 | Read |
| 2015/0096707 A1* | 4/2015 | Hintze .................. B29C 33/303 164/4.1 |

FOREIGN PATENT DOCUMENTS

| DE | 699 09 709 T2 | 6/2004 |
| DE | 10 2006 003 556 B4 | 8/2007 |

(Continued)

OTHER PUBLICATIONS

PCT/EP2018/071223, International Search Report dated Dec. 17, 2018 (Two (2) pages).

(Continued)

*Primary Examiner* — Jermie E Cozart
(74) *Attorney, Agent, or Firm* — Crowell & Moring LLP

(57) ABSTRACT

A method for producing or assembling a product which includes at least two components, for example a motor vehicle or a motor vehicle module, by at least two fixing parts. The first fixing part is formed as a female part and the second fixing part is formed as a male part. The components disposed at a processing station and the first fixing part are measured by a measuring device, for example by a stationary camera or a camera fastened on a first or a second manipulator or photogrammetry bar having three cameras, and a deviation from a target geometry or target position is determined, and a corrected target position of the second fixing part is calculated on the basis of the determined deviation, such that the second fixing part is joined together with the first fixing part by the first manipulator and the product is thus produced.

10 Claims, 2 Drawing Sheets

(56) References Cited

FOREIGN PATENT DOCUMENTS

| | | |
|---|---|---|
| DE | 10 2007 045 705 A1 | 4/2009 |
| DE | 10 2010 015 031 A1 | 11/2010 |
| EP | 1 646 439 A2 | 4/2006 |
| EP | 2 463 182 A1 | 6/2012 |

OTHER PUBLICATIONS

German Search Report issued in German counterpart application No. 10 2017 215 028.9 dated Jul. 10, 2018, with Statement of Relevancy (Six (6) pages).

\* cited by examiner

METHOD FOR PRODUCING A PRODUCT COMPRISING AT LEAST TWO COMPONENTS

CROSS REFERENCE TO RELATED APPLICATIONS

This application is a continuation of PCT International Application No. PCT/EP2018/071223, filed Aug. 6, 2018, which claims priority under 35 U.S.C. § 119 from German Patent Application No. 10 2017 215 028.9, filed Aug. 29, 2017, the entire disclosures of which are herein expressly incorporated by reference.

BACKGROUND AND SUMMARY OF THE INVENTION

The invention relates to a method for producing a product comprising at least two components, such as structural parts and/or assemblies, a processing system which is operable or operated by such a method, and a product which is produced by such a method or by such a processing system.

Methods for producing a product comprising at least two components, such as structural parts and/or assemblies, are known. The individual components are provided here as joining partners. Due to their natural fabrication tolerances, it can never be entirely avoided that the two components to be joined (joining partners) cannot be joined together in their orientation and position relative to each other without corrections. For this, it is known to clamp the individual components in clamping tools and undertake dimensional adjustments on the clamping assemblies which dictate the geometry, which proves to be expensive.

In the known methods, on account of the natural fabrication tolerances it is costly to ensure an end tolerance of the finished product, which may be composed of multiple components.

An object of an exemplary embodiment of the invention is to provide a method in which compensating for fabrication tolerances of individual components is easier.

This object is achieved by a method for producing a product comprising at least two components, such as structural parts and/or assemblies, such as a motor vehicle or a motor vehicle assembly, having the steps:

a. measuring an actual geometry of a first component as well as an actual position of at least one first fixing means arranged on the first component and/or measuring an actual geometry of a second component to be joined with the first component;

b. comparing the actual geometry of the first component and the actual position of the at least one first fixing means on the first component to a target geometry of the first component or a target position of the first fixing means stored in a control unit and/or comparing of the actual geometry of the second component to a target geometry of the second component stored in a control unit;

c. determining a deviation or an agreement of the actual geometry with the target geometry of the first component or of the actual position with the target position of the first fixing means and/or determining a deviation or an agreement of the actual geometry with the target geometry of the second component;

d. calculating a target position of at least one second fixing means to be arranged on the second component by the control unit at least in dependence on the deviation or agreement of the actual geometry with the target geometry of the first component, the actual position with the target position of the first fixing means, and the actual geometry with the target geometry of the second component; and e. arranging the at least one second fixing means in the target position at or on the second component.

The first component and the second component may be structural parts or assemblies of the product. The product may be a motor vehicle or an assembly of the motor vehicle.

The method makes it possible to compensate for fabrication tolerances of the individual components, especially the first component and the second component, by calculating the target position of the second fixing means on the second component. The target position in this way corresponds to a corrected position in which the second fixing means can be secured, and it plays a correction role.

Because the second fixing means can be secured at the target position of the second component, the target position being calculated with the aid of the deviations or agreements of the actual geometries with the target geometries and the actual positions with the target positions, the first component and the second component can be joined together free of clamping tools. This enables a so-called best fit design in regard to the product.

The first fixing means may be, for example, a fixing means which receives a female part. In this case, the second fixing means can be designed as a male part. The first fixing means and second fixing means constitute a so-called component-integrated feature (CIF).

In one embodiment of the method, it proves to be advantageous to include the following steps:

a. arranging the first component and/or the second component on a processing station of a processing system;

b. possibly arranging the at least one first fixing means on or at the first component; and c. joining the first component to the second component by arranging the at least one first fixing means on the at least one second fixing means.

Basically, it is conceivable that the first fixing means are already joined to the first component. As a result, step b may only be done optionally.

During step c, in which the first component is joined to the second component by arranging the at least one first fixing means on the at least one second fixing means, the first fixing means and the second fixing means can be clipped together.

The securing of the first fixing means on the second fixing means may be a preliminary joining. In such a case, it is conceivable that a further step is provided for the final securing of the first component to the second component by further joining steps, such as screwing, riveting, gluing, soldering and/or welding.

If the product comprises more components than the first component and the second component, it has proven to be advantageous when the calculation of the target position of the at least one second fixing means on the second component by the control unit is done at least in dependence on the deviation or agreement of the actual geometry relative to the target geometry of at least one further component and/or the deviation or agreement of the actual position relative to the target position of at least one further fixing means, which form the product together with the first component and the second component.

In such a case, the target position of the at least one second fixing means on the second component can be optimized by taking into account the later end product.

Furthermore, it has proven to be advantageous when the arranging of the at least one first fixing means on the first component, the arranging of the at least one second fixing means on the second component, and/or the joining of the first component to the second component is done by at least one first manipulator, such as a human being or a robot, especially of the processing system.

When the first manipulator comprises a robot, for example, this robot may be a multiple-axis kind, or it may have kinematics comprising a corresponding number of degrees of freedom.

In order to increase the precision of the actual position of the second fixing means after the arranging by the first manipulator on the second component, it has proven to be advantageous when the method involves detecting of the actual geometry of the first manipulator and the actual position of the first manipulator on the first and/or second component, especially the actual position of the first manipulator when arranging the at least one first fixing means on the first component and/or when arranging the at least one second fixing means on the second component.

The manipulator may be movable for example on a travel axis. Furthermore, a joining tool may be graspable and operable by the manipulator.

In one modification of the last-mentioned embodiment of the method, it has proven to be advantageous when the method involves actuating of at least the first manipulator to reach the target position of the second fixing means by the control unit at least in dependence on the actual geometry of the first manipulator and/or the actual position of the first manipulator on the first and/or second component.

In such a case, the first manipulator can be actuated under metering.

It has proven to be advantageous when the measuring of the actual geometry of the first component, the measuring of the actual position of the first fixing means on the first component, the measuring of the actual geometry of the second component and/or the measuring of the actual position of the first manipulator when arranging the at least one first fixing means on the first component and/or when arranging the at least one second fixing means on the second component is done by a stationary measuring device and/or a measuring device arranged on a second manipulator or the first manipulator which is arranging the fixing means on the components.

When the measuring device is stationary, the measuring can be done easily and time-efficiently. When the measuring device is secured to a second manipulator, the applicability of the measuring device is broadened.

In the latter case, calibration steps may be provided, if the measuring device is secured to a second manipulator.

By providing the measuring device, it becomes possible to measure the structural geometry of the first component and/or the second component as well as that of the first fixing means and/or the second fixing means and their position on the first component or the second component. Moreover, a correction of the first manipulator relative to the fixing means may occur. The measuring device, for example, may comprise a camera system, in which a tracker for example is permanently installed. This makes possible a so-called active robot tracking.

Moreover, the measuring device may comprise a photogrammetry bar with at least three cameras, able to detect multiple tools and components that can be secured on the manipulator, such as components or fixing means.

Finally, it has proven to be advantageous in one embodiment of the method when the method involves the step of measuring of the product by the measuring device. This makes possible a verification of the manufacturing tolerances and precisions after the joining of the individual components of the product.

Furthermore, the object is achieved by a processing system to carry out a method with at least one of the aforementioned features having at least one processing station at which or on which at least one first component and/or one second component is or can be arranged, having at least one first manipulator for handling and/or processing the first component and/or second component and for arranging a first fixing means on the first component and/or a second fixing means on the second component, having at least one measuring device for measuring the first component, the second component, the first fixing means and/or the second fixing means, and having at least one control unit for actuating the at least one first manipulator under metering.

Thanks to the turntable, a seventh axis can be realized in addition to the six axes of the robot.

Finally, the object is achieved by a product having at least a first component and having a second component joined to the first component, which product is produced by a method having at least one of the aforementioned features and/or which is manufactured in or at a processing system having at least one of the aforementioned features.

Further features, details and advantages of the invention will emerge from the enclosed patent claims, from the drawing representations and the following description of a preferred embodiment of the method.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
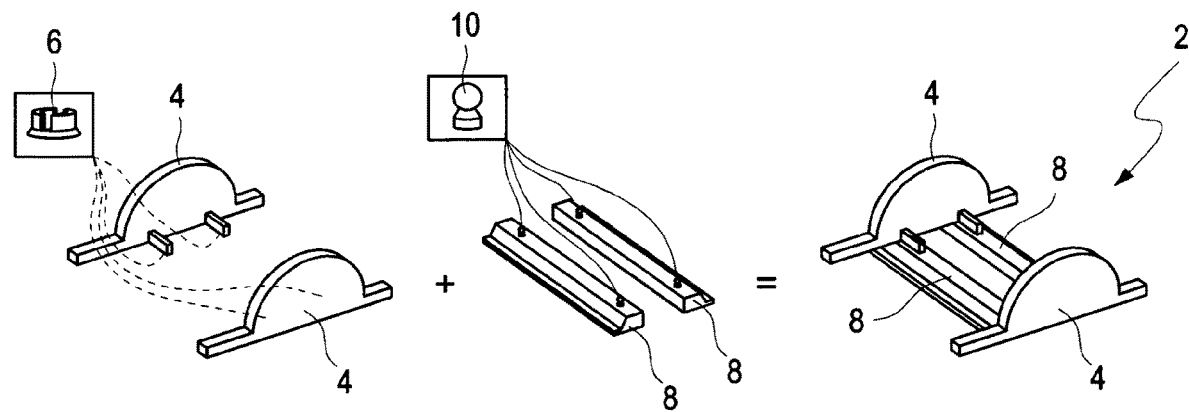
FIG. 1 is a schematic isometric representation of individual components and joining stages of the product.
Figure 3:
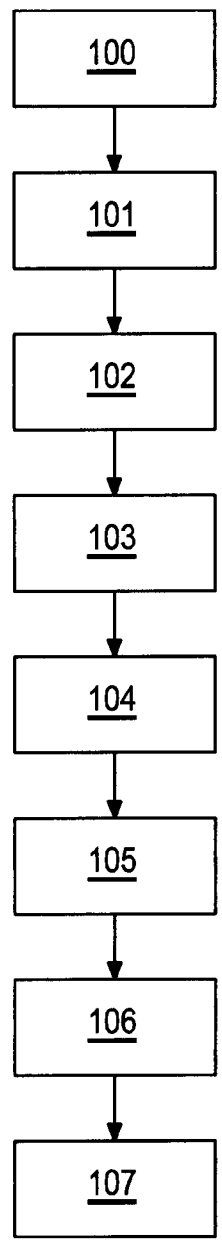
FIG. 3 is a schematic flow chart of a method.

FIG. 1 shows an embodiment of a product designated overall with reference number 2, which is produced by a method according to FIG. 3.

In the exemplary embodiment shown in FIG. 1, the product 2 comprises two first components 4, on which first fixing means 6 are secured. Furthermore, the exemplary embodiment of the product 2 according to FIG. 1 shows two second components 8, on which two second fixing means 10 are respectively secured. The first fixing means 6 are designed as a female part and the second fixing means 10 as a male part.

Figure 2:
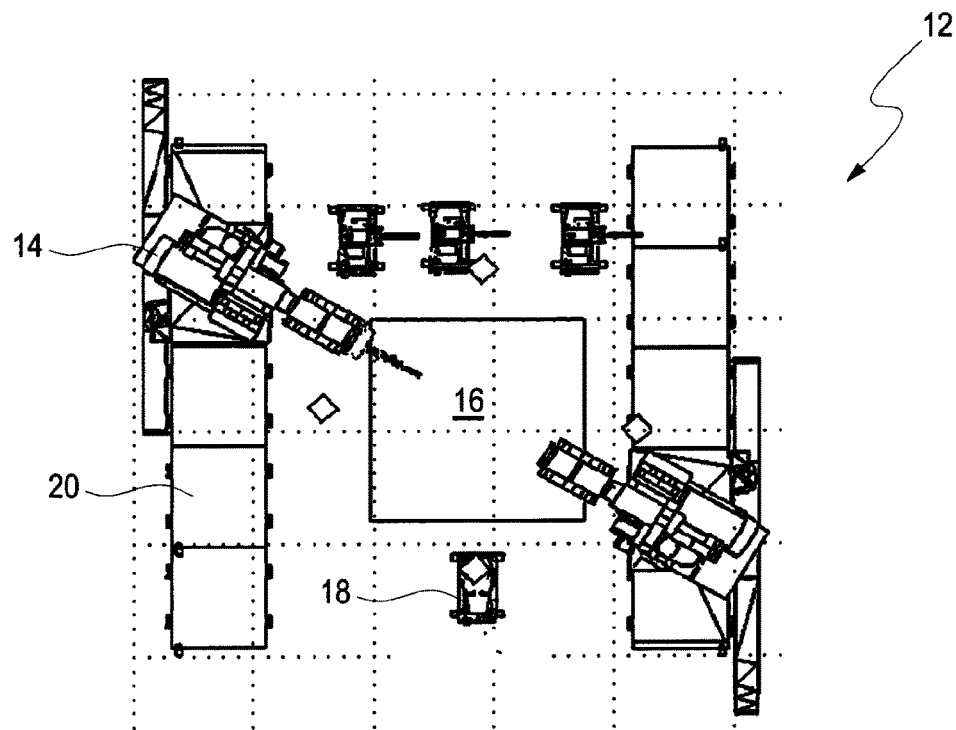
FIG. 2 is a top view of a processing system.

FIG. 2 shows a top view of a processing system designated overall by reference number 12, on which a product 2 per FIG. 1 can be produced and a method per FIG. 3 can be carried out. In the exemplary embodiment of the processing system 12 shown in FIG. 2, it comprises a first manipulator 14, by which the first component 4, the second component 8, the first fixing means 6 and the second fixing means 10 can be handled. These can be set down on a processing station 16 in the processing system 12.

Furthermore, the processing system 12 comprises a measuring device 18, which is arranged stationary in the exemplary embodiment shown in FIG. 2 and with which the first components 4, the second components 8, the first fixing means 6, the second fixing means 10 and the first manipulator 14 can be measured. Furthermore, the processing system 12 comprises a control unit 20, by which the method can be supervised and by which the first manipulator 14 in particular can be actuated.

In the exemplary embodiment shown in FIG. 2, the first manipulator 14 comprises a 6-axis robot which can move under linear guidance. The processing station 16 comprises a turntable, which can turn about an axis emerging from the plane of the table, thereby establishing a seventh axis.

With the aid of FIG. 3, the method according to the invention shall be described, considering both FIGS. 1 and 2.

In a first step 100, the first component 4 and/or the second component 8 is placed on the processing station 16 of the processing system 12.

In a following optional step 101, the first fixing means 6 is secured by the manipulator 14 on the first component 4. However, it is also conceivable for the first component 4 to be mounted already in step 100 with fixing means 6 secured to the first component 4.

In a following step 102, the actual geometry of the first component 4 as well as the actual position of the first fixing means 6 mounted on the first component 4 are measured. Furthermore, the actual geometry of the second component 8 is measured by the measuring device 18.

In a following step 103, comparing is done for the actual geometry of the first component 4 and the actual position of the at least one first fixing means 6 with respect to a target geometry of the first component 4 and the target position of the at least one first fixing means 6 stored in the control unit 20, as well as comparing of the actual geometry of the second component 8 with respect to a target geometry of the second component 8 stored in the control unit 20.

In a step 104, a deviation or agreement of the actual geometry with the target geometry of the first component 4 or the actual position with the target position of the at least one first fixing means 6 and a deviation or agreement of the actual geometry with the target geometry of the second component 8 is ascertained.

From these deviations and agreements, in a following step 105 a target position of the at least one second fixing means 10 on the second component 8 is calculated.

In this way, in a following step 106, the first manipulator 14 is actuated by the control unit 20 in such a way that it arranges the at least one second fixing means 10 at the target position calculated in step 105 or on the second component 8. The first manipulator 14 may be actuated by the control unit 20 in concert with the measuring device 18. In such a case, the measuring device 18 detects the actual geometry of the first manipulator 14 and the actual position of the first manipulator 14 on the first component 4 and/or on the second component 8.

After placing the second fixing means 10 at the target position, in a following step 107 the first component 4 may be joined to the second component 8.

The features of the invention as disclosed in the previous description, in the claims and in the drawing may be essential to the realization of the invention in its different embodiments either alone or also in any given combination.

LIST OF REFERENCE CHARACTERS 2 product
4 first component
6 first fixing means
8 second component
10 second fixing means
12 processing system
14 first manipulator
16 processing station
18 measuring device
20 control unit
100-107 steps of the method The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a product including at least two components, comprising the acts of:
   a. measuring an actual geometry of a first component and an actual position of a first fixing part disposed on the first component and/or measuring an actual geometry of a second component to be joined with the first component;
   b. comparing the actual geometry of the first component and the actual position of the first fixing part on the first component to a target geometry of the first component or a target position of the first fixing part stored in a control unit and/or comparing of the actual geometry of the second component to a target geometry of the second component stored in the control unit;
   c. determining a deviation or an agreement of the actual geometry of the first component with the target geometry of the first component or of the actual position of the first fixing part with the target position of the first fixing part and/or determining a deviation or an agreement of the actual geometry of the second component with the target geometry of the second component;
   d. calculating a target position of a second fixing part to be disposed on the second component by the control unit at least in dependence on the deviation or agreement of the actual geometry of the first component with the target geometry of the first component, the actual position of the first fixing part with the target position of the first fixing part, and the actual geometry of the second component with the target geometry of the second component; and
   e. arranging the second fixing part in the target position of the second fixing part at or on the second component.

2. The method according to claim 1 further comprising the acts of:
   disposing the first component and/or the second component on a processing station of a processing system; and
   joining the first component to the second component by disposing the first fixing part on the second fixing part.

3. The method according to claim 1, wherein the calculating of the target position of the second fixing part on the second component by the control unit is performed at least in dependence on a deviation or an agreement of an actual geometry of a third component relative to a target geometry of the third component and/or a deviation or an agreement of an actual position of a third fixing part relative to a target position of the third fixing part, which form the product together with the first component and the second component.

4. The method according to claim 2, wherein an act of disposing of the first fixing part on the first component, the disposing of the second fixing part on the second component, and/or the joining of the first component to the second component is performed by a first manipulator of the processing system.

5. The method according to claim 4, wherein the first manipulator is a human being or a robot.

6. The method according to claim 4 further comprising the act of detecting of an actual geometry of the first manipulator and an actual position of the first manipulator on the first and/or the second component.

7. The method according to claim 6, wherein the actual position of the first manipulator is detected when disposing the first fixing part on the first component and/or when disposing the second fixing part on the second component.

8. The method according to claim 6 further comprising the act of actuating of the first manipulator to reach the target position of the second fixing part by the control unit at least in dependence on the actual geometry of the first manipulator and/or the actual position of the first manipulator on the first and/or the second component.

9. The method according to claim 7, wherein the measuring of the actual geometry of the first component, the measuring of the actual position of the first fixing part on the first component, the measuring of the actual geometry of the second component and/or the detecting of the actual position of the first manipulator when disposing the first fixing part on the first component and/or when disposing the second fixing part on the second component is performed by a stationary measuring device and/or a measuring device disposed on a second manipulator or the first manipulator which is disposing the first and second fixing parts on the first and second components.

10. The method according to claim 9 further comprising the act of measuring of the product by the measuring device.

* * * * *